June 13, 1950  J. A. MULLER  2,511,538
ROTARY BALANCING VALVE
Filed Oct. 1, 1943  2 Sheets-Sheet 1
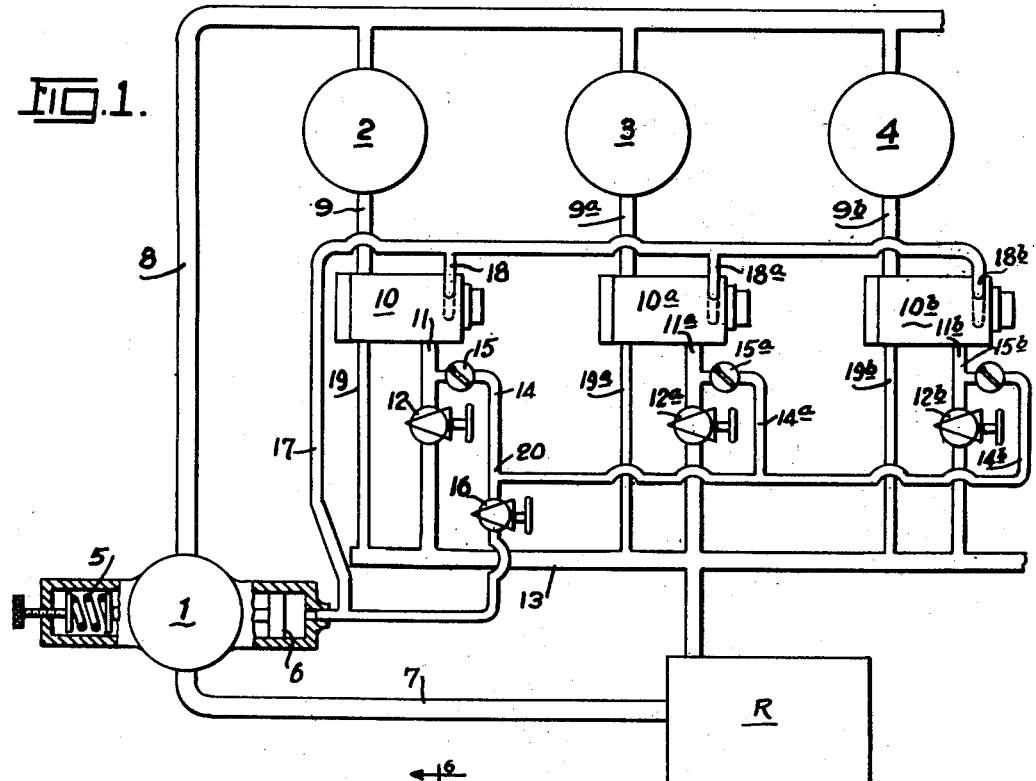
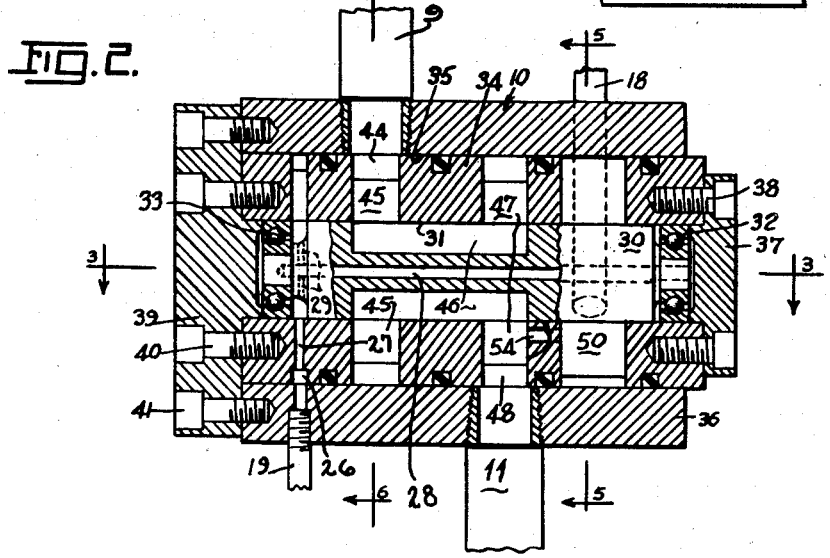
INVENTOR
JOHAN A. MULLER,
BY
Toulmin & Toulmin
ATTORNEYS June 13, 1950      J. A. MULLER      2,511,538
ROTARY BALANCING VALVE
Filed Oct. 1, 1943      2 Sheets-Sheet 2
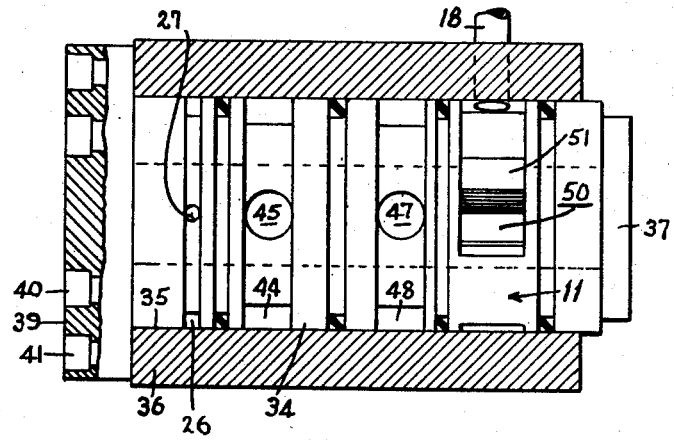
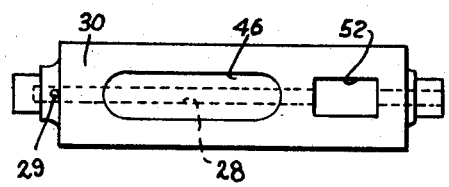
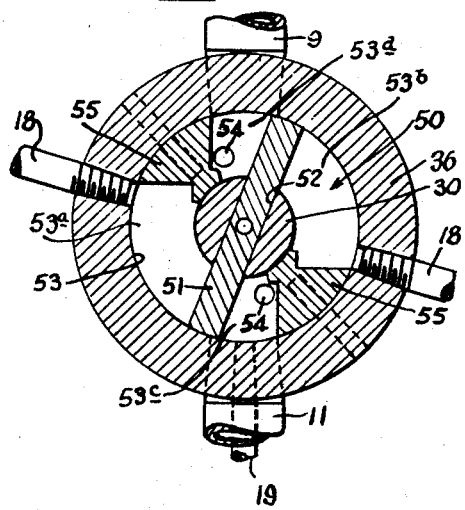 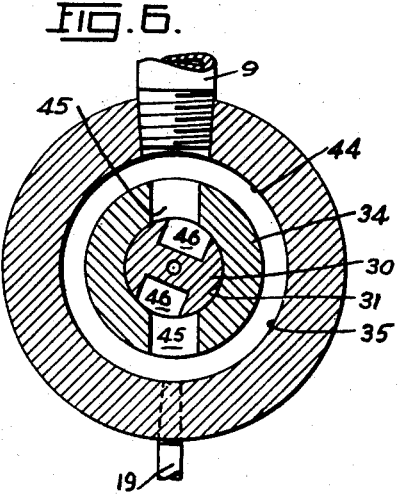
INVENTOR
JOHAN A. MULLER
BY
Toulmin & Toulmin
ATTORNEYS Patented June 13, 1950

2,511,538

UNITED STATES PATENT OFFICE 2,511,538

ROTARY BALANCING VALVE

Johan A. Muller, Dayton, Ohio, assignor to The Hydraulic Development Corp., Inc., Wilmington, Del., a corporation of Delaware Application October 1, 1943, Serial No. 504,648

7 Claims. (Cl. 137—139)

This invention relates to hydraulic apparatus and, in particular, to hydraulic valves. Specifically this invention relates to an automatically variable choke valve.

In my copending application, Serial No. 500,068 filed August 26, 1943, now Patent No. 2,415,603, granted February 11, 1944 a hydraulic system is shown wherein a plurality of motors are driven from a single pressure source, and the operating speed of each motor is automatically controlled, independently of any load conditions, or variations in load conditions, on any one or more of the other motors.

One of the elements of a system of this type is an automatically variable choke or restricting valve. This valve functions to hold a back pressure on the motor of sufficient value to maintain the speed constant, this speed having been preselected by the operator of the device.

In order to function properly, that is in order to control the motor speed within close limits, the variable restricting valve used in such control systems must be responsive to small pressure differentials.

In order for a valve to respond properly to small shifting forces it is necessary to provide the valve with accurately machined sliding surfaces or means for accurately aligning the moving element within the bore in which it operates. In the present invention a valve structure is provided in which the moving element is caused to be freely operable under small shifting forces by hydraulically balancing the valve and by accurately aligning the moving element within the valve bore.

The principal object of this invention, then, is to provide a fluid pressure operated variable restricting valve, sensitive to small pressure differentials.

It is an object to provide a fluid pressure operated valve in which all axial and radial thrusts due to the operating pressures are eliminated.

Various other objects will be apparent from the following description.

In the drawings:

Figure 1 is a view of a hydraulic system including the valve of this invention.

Figure 2 is a vertical section through the valve.

Figure 3 is a section through the valve and is indicated by the line 3—3 of Figure 2.

Figure 4 is an elevational view of the valve rotor.

Figure 5 is a transverse section through the valve that is indicated by the line 5—5 on Figure 2.

Figure 6 is a transverse section through the valve and is indicated by the line 6—6 of Figure 2.

Referring now to Figure 1 the hydraulic system illustrated therein comprises generally a variable delivery pump 1, hydraulic motors 2, 3 and 4, a reservoir R, and suitable interconnecting conduits and valves.

The variable delivery pump at 1 is adapted to be shifted on to stroke by the spring 5, the force of which is opposed by the control cylinder and piston assembly at 6.

In operation the pump 1 draws fluid from the reservoir R by means of the conduit 7 and delivers the same at increased pressure through the conduit 8 to the motors 2, 3 and 4. The discharge or exhaust fluid from the motor 2 passes through a conduit 9 into a valve at 10. Fluid from the valve 10 passes through conduit 11 and choke 12 into a conduit 13 and back to the reservoir R. Fluid is similarly conducted from the exhaust of motors 3 and 4 through similar valves and conduits back to the conduit 13 and thence to the reservoir R.

A branch conduit 14 is connected to the conduit 11 between the valves 10 and 12 and includes the check valve 15. Conduit 14 connects through the choke valve 16 with the conduit 17 and the pump control piston and cylinder unit at 6. The conduit 17 is connected by a conduit 18 into the valve 10 for a purpose which will become hereinafter apparent.

Valve 10 is also provided with a conduit 19 for the purpose of draining off slippage fluid, the manner of accomplishing this being more clearly explained in the following description.

The valves and conduits associated with the motors 3 and 4 are identical with those associated with the motor 2 and hence will not be described except to point out that the conduits 14a and 14b join with the conduit 14 at the point 20 ahead of the choke valve 16.

The valves and conduits identified with motors 3 and 4 are numbered similarly to those associated with the motor 2 and are identified by the subscripts a and b respectively.

Referring now to Figures 2, 3, 4, 5 and 6 the construction of the valve 10 is clearly shown. The valve comprises a rotor 30 mounted within a bore 31 and held in accurate axial alignment therewith by means of the anti-friction bearings at 32 and 33. The bore 31 is in a member 34 which is adapted to be mounted within the bore 35 of the housing member 36. The valve body 34 is closed at the right by means of the plate 37, this plate being suitably retained in position by means such as the screws 38. The left hand end of the valve casing 34 is closed by the plate 39 which is held in place on the valve body by means such as the screws 40 and extends outwardly to engage the housing 36 to which it is fastened by suitable means such as screws 41.

Fluid enters the valve 10 from the conduit 9 and passes into the annular groove 44 in the outer surface of the valve body 34 and passes from there through the radial bores 45 into the bore 31. Fluid passes from the bores 45 of the valve body 34, into the longitudinal grooves 46, of the rotor 30, thence into the bores 47 into the groove 48 from which groove it passes outwardly through the conduit 11.

The various levels in the valve 10 are suitably sealed off each from the other by means of annular sealing rings which are placed in grooves in the outer surface of the valve body 34.

The chamber at the right hand end of the casing 34 is drained by means of the axial passage 28 and the transverse passage 29, into the chamber at the left hand end; and then, by means of passage 27 and groove 26, into the exhaust conduit 19.

Referring now to Figure 6 the means whereby the valve 10 sets up a restriction in the discharge line of the motor will be apparent. The rotor 30 is adapted to rotate to effect a restriction between the bore 45 and the groove 46. As shown in Figure 6 the rotor 30 is partly turned to establish some degree of restriction between these passages. Further rotation of the rotor 30 in a clockwise direction would increase this restriction while rotation of the rotor 30 in a counter-clockwise rotation would decrease this restriction.

The means of effecting rotation of the rotor 30 is a hydraulic motor mounted within the valve casing and generally indicated by the numeral 50. This motor comprises a balanced vane motor and the construction thereof is clearly shown in Figure 5.

In Figure 5 the vane motor 50 is seen to comprise a vane 51 mounted in a slot 52 in the rotor 30 and adapted to move within the chamber 53 of the valve casing 36. Fluid pressure is introduced into the vane motor by means of conduits 18 into the sub-chambers 53a and 53b and by means of the drilled passages 54 into the chambers 53c and 53d. It will be noticed that the motive power generated in the chambers 53a and 53b are supplementary and that the same can be said of the power developed in the chambers 53c and 53d. Blocks 55 suitably retained within the bore 53 form permanent partitions separating the chambers 53a from 53d and chambers 53c from 53b.

The drilled passages 54 communicate with the bores 47 (Figure 2), and the conduits 18 are connected, by means of the conduit 17, with the pump control piston and cylinder at 6.

The system then operates as follows: fluid is drawn from the reservoir R through conduit 7 by the pump 1 and is discharged through the conduit 8 and passes therefrom into the motors 2, 3 and 4. Exhaust from the three motors is carried by means of conduits 9, 9a and 9b, to the valves 10, 10a and 10b, whence it is discharged through the conduits 11, 11a, and 11b, through the choke valves 12, 12a, and 12b, and thence by means of conduits 13 back to the reservoir.

Assume that the spring 5 has moved the flow control element of the pump 1 on full stroke, that is, completely to the right, then the pump will deliver at maximum capacity into the motors 2, 3 and 4. Fluid passing through these motors, for example, through the motor 2, passes through the exhaust conduits 9 and the valve 10 to the conduit 11, and passing then through the choke 12 to the exhaust conduit 13 a pressure is built up in the conduit 11, this pressure being conveyed through the check valve 15, the conduit 14, and the choke valve 16 to the pump control cylinder 6. This pressure has a tendency to shift the pump towards neutral, reducing the delivery and slowing down the motors. This pressure is also conducted by means of the conduit 17 and the conduit 18 to the chambers 53a and 53b (see Figure 5), where it is utilized in the vane motor to exert a counter-clockwise torque on the rotor. The pressure standing ahead of the choke valve 12 in the conduit 11 is also conducted by means of the drilled passages 54 (see Fig. 2) into the chambers 53c and 53b of the vane motor where it exerts a clockwise torque on the rotor. A counter-clockwise torque tends to rotate the rotor to decrease the restriction set up to the flow of fluid through the valve 10, and a clockwise torque tends to rotate the rotor to increase the restriction set up in the valve 10.

The valve rotor being free to rotate under the influence of the torque exerted on it by the vane motor will move to a position where the clockwise and counter-clockwise torque are exactly equal. It will be apparent, since the opposed areas in the vane motor are equal, that the valve rotor will come to rest only when the pressures standing in the vane motors are equal. It is further apparent that the highest of the pressures standing in the conduit 11, 11a, and 11b, will be the pressure standing in the conduit 17, and therefore in the conduits 18, 18a and 18b. Assuming that the pressure standing in the conduit 18 and sub-chambers 53a and 53b causes the rotor of the valve 10 to rotate counter-clockwise until there is no restriction to flow therethrough, the following action will take place: The motor 2 will tend to speed up and a greater quantity of fluid will pass through the conduit 9 and valve 10 into the conduit 11 and through the choke valves 12. This will cause an increased pressure in the conduit 11 and this pressure will be communicated by means of the drilled passages 54 to sub-chambers 53c and 53b. The speed of motor 2 will increase until the pressure standing in the conduit 11 is exactly equal to that standing in the conduit 18, at which time the clockwise and counter-clockwise torques being exerted on the rotor by the vane motor are exactly equal and opposite. Should the valve 10 not offer sufficient restriction to the flow of fluid, the speed of motor 2 will increase beyond this value and an increased pressure in the conduit 11 will cause the pressure in the sub-chambers 53c and 53d to be increased and the greater clockwise torque thus developed in the vane motor by this pressure will cause the valve rotor to turn to a position where an increased restriction will be set up in the valve 10 and a back pressure will be developed in the conduit 9 tending to maintain the speed of the motor 2. The speed of the motor 2 as well as the motors 3 and 4 is thus controlled by the balancing valves associated with each.

Consider now that the load on motor 2 is suddenly increased, all other conditions in the circuits remaining constant. Motor 2 will tend to slow down and less fluid will pass through the conduit 9 and valve 10 to the conduit 11 and choke valve 12. This causes the pressure in the conduit 11 to be reduced and the pressure standing in the chambers 53c and 53d is likewise reduced. The counterclockwise torque in the vane motor is now predominating and the rotor will turn counterclockwise to decrease the restriction being offered by the valve 10. The decreased restriction offered by the valve 10 will allow the motor 2 to speed up until the pressure balance in the vane motor is restored. Should the load on the motor 2 be suddenly decreased the reverse action will take place. The same applies to the motors 3 and 4 and the speed control for each of these is, as in the case of the motor 2, entirely independent of the variations of speed and load of any of the other motors in the system.

It has been considered up to now that the pump is operating at a certain average stroke, deviating from this only as is necessary to correct momentary variations in the speed of the driven motor. A study of the system of Figure 1 will reveal the factors which contribute to the control of this stroke. The pump stroke is directly subordinate to the setting of the choke valves 12, i. e. each choke valve will pass sufficient fluid to maintain the pump control pressure in the conduit 11 associated therewith, and the farther the valves 12 are opened the greater amount of fluid will flow therethrough. Conversely the more nearly closed the valves 12 are, the less fluid will be passed through them in order to develop the necessary control pressure. It will be seen from this that the pump stroke is proportional to the average degree of opening of the valves 12.

To sum up the action of this system: pressure fluid is supplied from the variable delivery pump at a rate sufficient to develop the control pressure in each of the conduits 11 and at sufficient pressure to cause the most heavily loaded of the motors in the system to perform its work satisfactorily. The fluid pressure delivered by the pump passes through the motors of the system and the balancing valves associated therewith and emerges into the conduits 11 at a common pressure. The fall in pressure between the main supply line and the conduit 11 is divided between the work loads on the motors and the variable restricting valves at 10, 10a and 10b. In other words the variable restricting valves operate together with the work loads on the various motors to maintain sufficient pressure head in the main supply line to adequately power the most heavily loaded motor in the system.

It will be noted that the arrangement of the passages 46 is such that the rotor is always in complete hydraulic balance under the pressure of the fluid passing through the valve. Also, that the disposition of the chambers of the vane motor is such that the vane motor is always in complete hydraulic balance under the pressure of the fluid therein. The entire moving structure is thereby maintained in a state of complete axial and radial hydraulic balance and excessive friction and wear is eliminated.

It will be understood that I desire to comprehend within my invention such modifications as come within the scope of the appended claims.

What I claim is:

1. A pressure operated valve including a casing forming a valve chamber having a fluid inlet and a fluid outlet, a valve rotor journaled for rotation in said chamber and adapted to be rotated to vary the fluid flow from inlet to outlet, said casing forming a cylindrical motor chamber coaxial with and separated from said valve chamber, said rotor having a cylindrical part extending through said motor coaxially thereof, said part having a diametrical, axially-extending slot, a vane in said slot in pressure-tight relation with said motor chamber and forming therewith diametrically opposite pressure chambers on both sides of said vane, means secured to the walls of said motor chamber in pressure-tight relation with said vane and said cylindrical part to close the end of said motor chamber, passage means in said casing connecting diametrically opposite pressure chambers with said outlet, and additional passages connecting diametrically opposite pressure chambers opposed to the first mentioned thereof for supplying pressure fluid thereto independently of the supply to said first mentioned chamber.

2. A pressure operated valve including a casing forming a valve chamber having a fluid inlet and a fluid outlet, a valve rotor journaled for rotation in said chamber to control the flow of fluid from the inlet to the outlet, said valve rotor having passages extending thereabout for connecting said inlet and said outlet and for hydraulically balancing said rotor, said casing forming at one end thereof a second chamber co-axial with and separated from said valve chamber, said rotor having a part thereof extending through said second chamber co-axially thereof, a vane secured to said part and in pressure-tight relation with said second chamber, partition means in said second chamber forming with said vane a plurality of motor chambers, passage means in said casing connecting said outlet with one of said motor chambers on one side of said vane, and additional passage means connected with another of said motor chambers on the opposite side of said vane for supplying pressure fluid thereto independently of the supply of fluid to said one side of said vane whereby hydraulic unbalance between the sides of said vane causes actuation of said valve rotor.

3. A pressure operated valve comprising a casing, having inlet means and outlet means, a rotary valve in said casing adapted to be rotated to control the flow from said inlet to said outlet and including a shaft, a rotor chamber in said casing through which said shaft extends, blocks within said chamber and extending into contact with said shaft whereby to form with said shaft, blocks and chamber walls pressure-tight sub-chambers, and conduit means connecting each sub-chamber with said casing outlet means, said shaft having a slot, and a vane extending through said slot and having portions extending into pressure tight contact with the walls of each sub-chamber, said conduit means having a connection into one of said sub-chambers between one of said blocks and one side of said vane, and a connection into an opposite sub-chamber between the other of said blocks and the other side of said vane.

4. A pressure operated valve comprising a casing having an inlet means and an outlet means, a valve mounted on a rotary shaft in said casing, said valve having passageways variably connecting said inlet means and outlet means, a transverse partition in said casing providing a chamber separated from said valve passageways, and a vane motor in said chamber mounted on said rotary shaft, bearings for said valve, and drainage means including a bore extending longitudinally through said shaft and having a conduit extending outside of said casing whereby slippage may be withdrawn from the outer periphery of said valve and from said motor.

5. In a valve, a hollow casing having axially spaced inlet and outlet means, a sleeve in said casing having annular grooves in communication with said inlet and outlet means, a bore through said sleeve, ports communicating said bore with said grooves, a valve rotor in said bore having passages therein for variably connecting said ports, arcuate slots in said sleeve adjacent one end thereof, a vane carried by said rotor and having its ends extending into said slots and forming with said casing, said sleeve and said rotor a plurality of motor chambers, and means for supplying pressure fluid to said motor chambers on opposite sides of said vane for varying the angular position of said rotor in said sleeve.

6. In a valve, a hollow casing having an inlet port and an outlet port axially spaced therealong, a sleeve in said casing having an annular groove in alignment with each said port, a bore through said sleeve, ports connecting each groove with said bore, a valve rotor mounted in said bore and having passages therealong for variably interconnecting said last mentioned ports, diametrically opposite slots in said sleeve adjacent one end thereof, vane means carried by said rotor and extending into said slots to form with said casing, said sleeve and said rotor a plurality of pairs of diametrically opposite motor chambers, and means hydraulically connecting said pairs of chambers.

7. In a valve, a hollow casing having axially spaced inlet and outlet ports, a sleeve in said casing having grooves in alignment with said ports, a bore through said sleeve, ports in said sleeve communicating the grooves thereof with said bore, a valve rotor in said bore having passages for connecting the ports in said sleeve, vane motor means formed with said rotor, sleeve and casing at one end of said valve, means for supplying pressure fluid to said vane motor means for varying the angular position of said rotor in said valve, and sealing means between said casing and sleeve dividing the same into a plurality of axial zones respectively containing said inlet port, said outlet port and said vane motor means.

JOHAN A. MULLER.

REFERENCES CITED

The following references are of record in the file of this patent:

UNITED STATES PATENTS

| Number | Name | Date |
|---|---|---|
| 514,295 | Wennberg | Feb. 6, 1894 |
| 542,635 | Gamache | July 16, 1895 |
| 561,370 | Brassington | June 2, 1896 |
| 637,980 | Weatherhead | Nov. 28, 1899 |
| 648,695 | Krone | May 1, 1900 |
| 700,434 | Lord | May 20, 1902 |
| 840,796 | Oakman | Jan. 8, 1907 |
| 874,959 | Gove | Dec. 31, 1907 |
| 929,238 | McGillivray | July 27, 1909 |
| 930,158 | Connett | Aug. 3, 1909 |
| 1,173,996 | Bull | Feb. 29, 1916 |
| 1,287,273 | Fisher | Dec. 10, 1918 |
| 1,302,752 | Adams | May 6, 1919 |
| 1,314,341 | Larner | Aug. 26, 1919 |
| 1,646,631 | Schnyder | Oct. 25, 1927 |
| 1,699,676 | Rush | Jan. 22, 1929 |
| 1,787,686 | Kerr | Jan. 6, 1931 |
| 2,054,258 | Kinzie | Sept. 15, 1936 |
| 2,054,259 | Kinzie | Sept. 15, 1936 |

FOREIGN PATENTS

| Number | Country | Date |
|---|---|---|
| 301,950 | Great Britain | Dec. 10, 1928 |